(12) United States Patent
Ishimoto et al.

(10) Patent No.: US 11,077,500 B2
(45) Date of Patent: Aug. 3, 2021

(54) THREE-DIMENSIONAL SHAPING METHOD

(71) Applicant: Matsuura Machinery Corporation, Fukui (JP)

(72) Inventors: Kousuke Ishimoto, Fukui (JP); Makoto Ichimura, Fukui (JP); Kouichi Amaya, Fukui (JP)

(73) Assignee: Matsuura Machinery Corporation, Fukui (JP)

( * ) Notice: Subject to any disclaimer, the term of this patent is extended or adjusted under 35 U.S.C. 154(b) by 29 days.

(21) Appl. No.: 16/139,492

(22) Filed: Sep. 24, 2018

(65) Prior Publication Data
US 2019/0022754 A1    Jan. 24, 2019

Related U.S. Application Data (62) Division of application No. 14/747,120, filed on Jun. 23, 2015, now Pat. No. 10,124,409.

(30) Foreign Application Priority Data

Feb. 16, 2015    (JP) .............................. JP2015-027553

(51) Int. Cl.
| | | |
|---|---|---|
| *B22F 10/20* | (2021.01) | |
| *B29C 64/153* | (2017.01) | |
| *B33Y 10/00* | (2015.01) | |
| *B33Y 50/02* | (2015.01) | |
| *B22F 3/24* | (2006.01) | |

(Continued)

(52) U.S. Cl.
CPC .............. *B22F 10/20* (2021.01); *B22F 10/28* (2021.01); *B22F 10/50* (2021.01); *B22F 10/85* (2021.01); *B29C 64/153* (2017.08); *B22F 2003/247* (2013.01); *B22F 2998/10* (2013.01); *B33Y 10/00* (2014.12); *B33Y 50/02* (2014.12); *Y02P 10/25* (2015.11)

(58) Field of Classification Search
None
See application file for complete search history.

(56) References Cited

U.S. PATENT DOCUMENTS

| | | | |
|---|---|---|---|
| 7,867,431 B2 * | 1/2011 | Higashi | B22F 3/105 264/408 |
| 2006/0208396 A1 * | 9/2006 | Abe | B22F 3/1055 264/497 |

(Continued)

FOREIGN PATENT DOCUMENTS

| | | |
|---|---|---|
| JP | 2004-277877 A | 10/2004 |
| JP | 2004-277881 A | 10/2004 |
| JP | 2015-17295 A | 1/2015 |

*Primary Examiner* — Anthony J Zimmer
*Assistant Examiner* — Michael J Kachmarik
(74) *Attorney, Agent, or Firm* — Richard M. Goldberg (57) ABSTRACT

A three-dimensional shaping method in which the powder supplying blade 2 is able to travel without any problems, in which a control system stores in advance a fine sintered region 11 so that any one of a cross-sectional area or a mean diameter in the horizontal direction, a shaping width and an undercut angle at the end is equal to or less than a predetermined extent, or the control system makes a determination in a sintering step, for said each element, so in the case of the raised sintered portions 12 forming on the upper side of the sintered region 11, a rotating cutting tool 3 cuts the raised sintered portions 12 entirely or partially, thereby achieving the object.

2 Claims, 9 Drawing Sheets

(51) Int. Cl.
  *B22F 10/50*   (2021.01)
  *B22F 10/85*   (2021.01)
  *B22F 10/28*   (2021.01)

(56) References Cited

U.S. PATENT DOCUMENTS

2014/0147328 A1\* 5/2014 Abe ................ B22F 3/1055
                                                        419/28
2015/0037601 A1\* 2/2015 Blackmore ........ B23K 15/0086
                                                        428/600
2015/0258609 A1\* 9/2015 Teulet ................ B33Y 40/00
                                                        419/53
2017/0136545 A1    5/2017 Yoshimura et al.

\* cited by examiner

THREE-DIMENSIONAL SHAPING METHOD

FIELD OF THE INVENTION

The present invention relates to a three-dimensional shaping method in which lamination of a powder material and formation of a sintered layer based on the thus laminated powder material are sequentially repeated, thereby producing a processed article.

BACKGROUND OF THE INVENTION

In the described three-dimensional shaping method, it is adopted to repeat a process of sintering for a position at which a processed article is expected to be formed by scanning with the use of an optical beam, after step of formation of the powder layer.

Although the three-dimensional shaping method is accompanied with the characteristics and advantages to the maximum extent in that various types of shapes are adaptable in a processed article, it is unavoidable that there often arises a case that a cross-sectional area in a horizontal direction or a mean diameter is equal to or less than a predetermined extent, a case that a shaping width is equal to or less than a predetermined extent, and a case that an undercut angle formed by an upper face and a lower inclined face at the edge is equal to or less than a predetermined extent.

Figure 11:
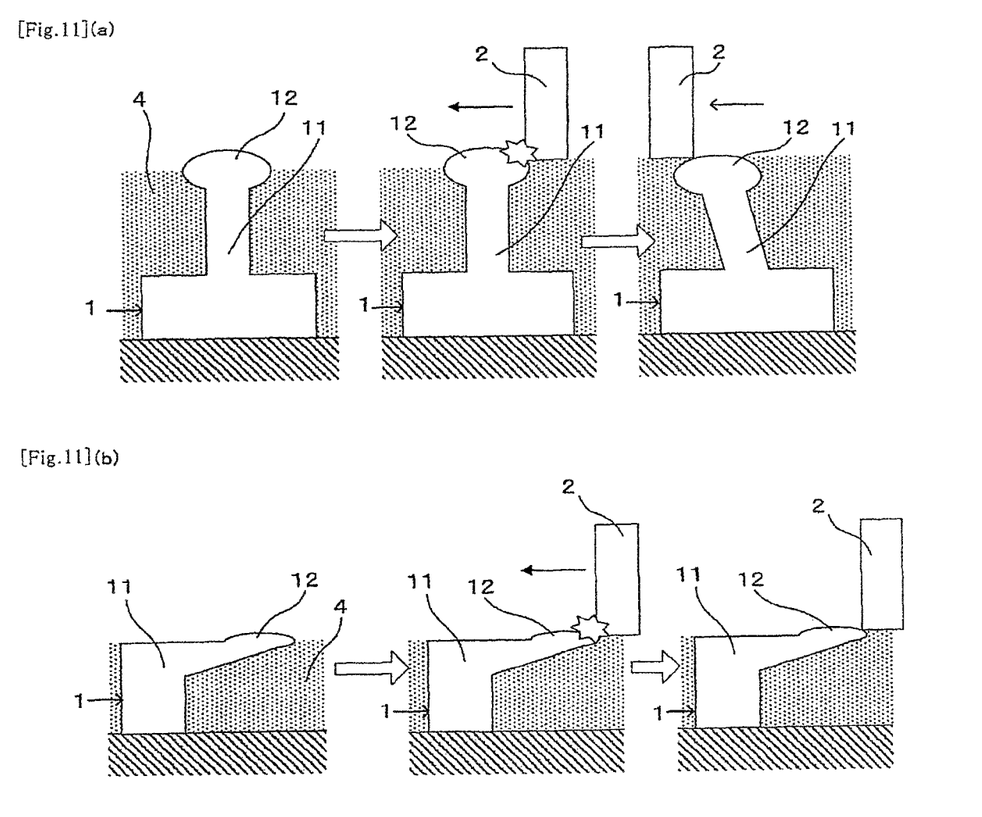
FIG. 11 is a side view which explains problems of raised sintered portions in conventional technologies, and (a) shows a case that a cross-sectional area or a mean diameter in the horizontal direction is equal to or less than a predetermined extent, while (b) shows a case that an undercut angle between an upper face and a lower inclined face at the end is equal to or less than a predetermined extent.

In each of above-described cases, when a sintered region is irradiated with an optical beam, not only a previously expected sintered region is formed only on a powder layer which has already been formed, but also, as shown in FIG. 11(a), (b), it is unavoidable to often arise such a case that a raised sintered portions are formed at an upper side from a region of the powder layer.

In the case that such raised sintered portion is formed, when a powder supplying blade travels in order to form a powder layer on a next layer on the upper side of each layer to which sintering is performed, the raised sintered portions will, as shown in FIG. 11 (a), inevitably result in an accident such that the raised sintered portions collide with the powder supplying blade and a sintered region which has already been provided are deformed.

Furthermore, as shown in FIG. 11 (b), the powder supplying blade inevitably collides and stops.

In order to avoid the above-described problem, inevitably, in a stage before traveling of the powder supplying blade for forming a powder layer of the next step, it is necessary to cut the raised sintered portions entirely or partially by using a rotating tool.

In order to cope with each of the cases that has been described previously, a great amount of time and complicated know-how are necessary for clearly distinguishing in advance a region at which the raised sintered portion is formed and also for realizing cutting of the raised sintered portion prior to a step of forming a next powder layer.

Nevertheless, spending a great amount of time does not always lead to find out the raised sintered portions with certainty.

Furthermore, the know-how is based on accumulation of subjective experience at work sites, and no objective standard can be obtained from such know-how.

Taking account the above-described situation, it is impossible to find out conventional technologies for dealing with raised sintered portions are in dealing with possible formation of the raised sintered portions or the raised sintered portions which have already been formed.

For reference, Patent Document 1 explains a problem covering raised sintered portions on three-dimensional shaping and a method for dealing with the problem (Paragraphs [0006], and [0045]). However, Patent Document 1 recognizes the problem as a problem of degree of wettability in a stage that a powder layer is irradiated with an optical beam and also dealt with the problem by using metal powder greater in wettability. Therefore, unlike the present invention, no consideration or measures are given to the raised sintered portions in each of the previously described cases.

In Patent Document 2, abnormal drive load with the use of a blade for keeping uniform the surface of a powder layer or an optical method is employed to detect a raised portion due to an abnormal sintered portion (Claim 3, Claim 4). Then, the raised portion due to an abnormal sintered portion is removed, while repeating formation of a sintered layer or after all the sintered layers are completely formed (the paragraph of [Solution] in [Abstract] and Claim 1).

However, where the drive load with use of the blade is employed to detect the raised portion due to an abnormal sintered portion, it is necessary to stop the drive of the blade. On the other hand, it is also quite difficult to detect the abnormal sintered portion perfectly by an optical method.

In Patent Document 3 as well, the abnormal protrusions are detected based on an increase in torque of a motor for driving a blade (Paragraph [0052] with regard to FIG. 6 and Claim 4) or detected by using an optical method for checking the presence or absence of received light (Paragraphs [0061] to [0063] with regard to FIG. 15 and Claim 5). However, as with Patent Document 2, Patent Document 3 also has unavoidable technological defects.

PRIOR ART DOCUMENTS

Patent Documents

Patent Document 1: Japanese Published Unexamined Patent Application No. 2004-277877
Patent Document 2: Japanese Published Unexamined Patent Application No. 2004-277881
Patent Document 3: US Patent Publication No. 2006/0208396

SUMMARY OF THE INVENTION

Problem(s) to be Solved by the Invention

An object of the present invention is to provide a configuration of a three-dimensional shaping method in which there is detected efficiently and reliably a raised sintered part that will develop typically from a fine sintered region in such a case that any one of a horizontal cross section or a mean diameter, a shaping width and an undercut angle between an upper face and a lower inclined face at the edge, of a sintered portion on each layer, is equal to or less than a predetermined extent, thus enabling a powder supplying blade to travel around a next layer positioned on the upper side of the layer concerned without any problems.

Means for Solving the Problems

In order to solve the above problems,
regarding the case that a cross-sectional area or a mean diameter of a sintered site in a horizontal direction is equal to or less than a predetermined extent, basic configurations of the present invention are composed of (1)-1 a three-dimensional shaping method in which after formation of a powder layer with a predetermined thickness, a step for sintering the powder layer by an optical beam is performed at a predetermined number of times and, thereafter, a periphery thereof is cut, comprising that a control system stores in advance a region at coordinate positions in a horizontal direction and a height direction in which a cross-sectional area or a mean diameter of an expected sintered part in a horizontal direction is equal to or less than a predetermined extent, and when the region at the coordinate positions is present on an individual layer to be sintered, the control system temporarily stocks the region at the coordinate positions, and also after sintering of the layer concerned is completed, at an intermediate height position between the position of the surface on which the sintering has been completed and the lowest position of a powder supplying blade moving in the horizontal direction for forming a powder layer on a next layer on the upper side of the layer concerned, a rotating cutting tool travels around the region at the coordinate positions in the horizontal direction and an outer peripheral vicinity thereof according to instructions of the control system, thereby, in the case of raised sintered portions forming on the upper side of the region at the coordinate positions, the rotating cutting tool cuts the raised sintered portions entirely or partially, and (1)-2 a three-dimensional shaping method in which after formation of a powder layer with a predetermined thickness, a step for sintering the powder layer by an optical beam is performed at a predetermined number of times and, thereafter, a periphery thereof is cut, and comprising that on an individual layer to be sintered, a control system determines a length of a shaping path formed by a continuous line for each scanning of the layer concerned by the optical beam and when the length is determined to be equal to or less than a predetermined extent, the control system temporarily stocks coordinate positions in a horizontal direction and a height direction at a region of the shaping path, whose length has been determined to be equal to or less than the predetermined extent, and also after sintering of the layer concerned is completed, at an intermediate height position between the position of the surface on which the sintering has been completed and the lowest position of a powder supplying blade moving in the horizontal direction for forming a powder layer on a next layer on the upper side of the layer concerned, a rotating cutting tool travels around the region at the coordinate positions in the horizontal direction and an outer peripheral vicinity thereof according to instructions of the control system, thereby, in the case of raised sintered portions forming on the upper side of the region at the coordinate positions, the rotating cutting tool cuts the raised sintered portions entirely or partially, regarding the case that the shaping width of the sintered site is equal to or less than a predetermined extent, basic configurations of the present invention are composed of (2)-1 a three-dimensional shaping method in which after formation of a powder layer with a predetermined thickness, a step for sintering the powder layer by an optical beam is performed at a predetermined number of times and, thereafter, a periphery thereof is cut, comprising that a control system stores in advance a region at coordinate positions in a horizontal direction and a height direction in which a horizontal width of an expected sintered part is equal to or less than a predetermined extent, and when the region at the coordinate positions is present on an individual layer to be sintered, the control system temporarily stocks the region at the coordinate positions, and also after sintering of the layer concerned is completed, at an intermediate height position between the position of the surface on which the sintering has been completed and the lowest position of a powder supplying blade moving in the horizontal direction for forming a powder layer on a next layer on the upper side of the layer concerned, a rotating cutting tool travels around the region at the coordinate positions in the horizontal direction and an outer peripheral vicinity thereof according to instructions of the control system, thereby, in the case of raised sintered portions forming on the upper side of the region at the coordinate positions, the rotating cutting tool cuts the raised sintered portions entirely or partially, (2)-2 a three-dimensional shaping method in which after formation of a powder layer with a predetermined thickness, a step for sintering the powder layer by an optical beam is performed at a predetermined number of times and, thereafter, a periphery thereof is cut, comprising that on an individual layer to be sintered, a control system determines the number of parallel lines formed by folding back a continuous line for each scanning of the layer concerned by the optical beam, and when the number of the lines is determined to be equal to or less than a predetermined number of the lines, the control system temporarily stocks coordinate positions in a horizontal direction and a height direction at a region of a shaping path in which the number of the lines is determined to be equal to or less than a predetermined number of lines, and also after sintering of the layer concerned is completed, at an intermediate height position between the position of the surface on which the sintering has been completed and the lowest position of a powder supplying blade moving in a horizontal direction for forming a powder layer on a next layer on the upper side of the layer concerned, a rotating cutting tool travels around the region at the coordinate positions in the horizontal direction and an outer peripheral vicinity thereof according to instructions of the control system, thereby, in the case of raised sintered portions forming on the upper side of the region at the coordinate positions, the rotating cutting tool cuts the raised sintered portions entirely or partially, regarding the case that an undercut angle formed between an upper face and a lower inclined face at the end is equal to or less than a predetermined extent, basic configurations of the present invention are composed of (3)-1 a three-dimensional shaping method in which after formation of a powder layer with a predetermined thickness, a step for sintering the powder layer by an optical beam is performed at a predetermined number of times and, thereafter, a periphery thereof is cut, comprising that a control system stores in advance a region at coordinate positions in a horizontal direction and a height direction in which the undercut angle formed between the upper face and the lower inclined face at the edge of an expected sintered part is equal to or less than a predetermined extent, and when the region at the coordinate positions is present on an individual layer to be sintered, the control system temporarily stocks the region at the coordinate positions, and also after sintering of the layer concerned is completed, at an intermediate height position between the position of the surface on which the sintering concerned has been completed and the lowest position of a powder supplying blade moving in the horizontal direction for forming a powder layer on a next layer on the upper side of the layer concerned, a rotating cutting tool travels around the region at the coordinate positions in the horizontal direction and an outer peripheral vicinity thereof according to instructions of the control system, thereby, in the case that raised sintered portions are formed which is positioned on the upper side of the region at the coordinate positions, the rotating cutting tool cuts the raised sintered portions entirely or partially, and (3)-2 a three-dimensional shaping method in which after formation of a powder layer with a predetermined thickness, a step for sintering the powder layer by the optical beam is performed at a predetermined number of times and, thereafter, a periphery thereof is cut, comprising that on an individual layer to be sintered, a scanning position at the edge of a scanning site of an optical beam is increased horizontally in region and in a state of projecting to a greater extent than a scanning position at the edge of the optical beam on an immediately preceding sintered layer positioned so as to be adjacent to a lower side of the layer concerned at a position lower than the scanning position concerned, and also a height width between both edges thereof is divided by a horizontal width to calculate a ratio, and when the ratio is determined to be equal to or less than a predetermined number, a control system temporarily stocks coordinate positions in a horizontal direction and a height direction at the projection edge in which the ratio is determined to be equal to or less than the predetermined number and in a vicinity region thereof, and also after sintering of the layer concerned is completed, at an intermediate height position between the position of the surface on which the sintering concerned has been completed and the lowest position of a powder supplying blade moving in the horizontal direction for forming a powder layer on a next layer on the upper side of the layer concerned, a rotating cutting tool travels around the region at the coordinate positions in the horizontal direction and an outer peripheral vicinity thereof according to instructions of the control system, thereby, in the case of raised sintered portions forming on the upper side of the region at the coordinate positions, the rotating cutting tool cuts the raised sintered portions entirely or partially.

DESCRIPTION OF THE SYMBOLS

1: Shaped article
11: Sintered region
12: Raised sintered portion
2: Powder supplying blade
3: Tool
4: Powder layer

DETAILED DESCRIPTION OF THE INVENTION

Each of the basic configurations (1)-1 and (1)-2 is a method for dealing with the formation of raised sintered portions 12 resulting from the fact that a cross-sectional area or a mean diameter of a sintered part in the horizontal direction is equal to or less than a predetermined extent. Each of the basic configurations (2)-1 and (2)-2 is a method for dealing with the formation of the raised sintered portions 12 resulting from the fact that a shaping width of the sintered part is equal to or less than a predetermined extent. Each of the basic configurations (3)-1 and (3)-2 is a method for dealing with the formation of the raised sintered portions 12 resulting from the fact that an undercut angle formed between an upper face and a lower inclined face at the end of the sintered part is equal to or less than a predetermined extent.

Of the above-described respective methods, each of the basic configurations (1)-1, (2)-1 and (3)-1 stands on that the control system 5 stores in advance the region at coordinate positions in the horizontal direction and the height direction so that a value described in each of the above-described cases is equal to or less than a predetermined extent, and when a raised sintered portion 12 is formed on the upper side of a sintered region 11, a rotating cutting tool 3 cuts the raised sintered portion 12 entirely or partially according to control based on the storage. On the other hand, each of the basic configurations (1)-2, (2)-2 and (3)-2 stands on that the control system 5 determines whether or not a value described in each of the above-described cases is equal to or less than a predetermined extent, and when the raised sintered portion 12 is formed on the upper side of the sintered region 11, the rotating cutting tool 3 cuts the raised sintered portion 12 entirely or partially according to control based on the determination.

In the basic configuration (1)-1, the control system stores in advance the region at the coordinate positions in the horizontal direction and the height direction in which the cross-sectional area or the mean diameter of the expected sintered part in the horizontal direction is equal to or less than a predetermined extent.

Figure 4:
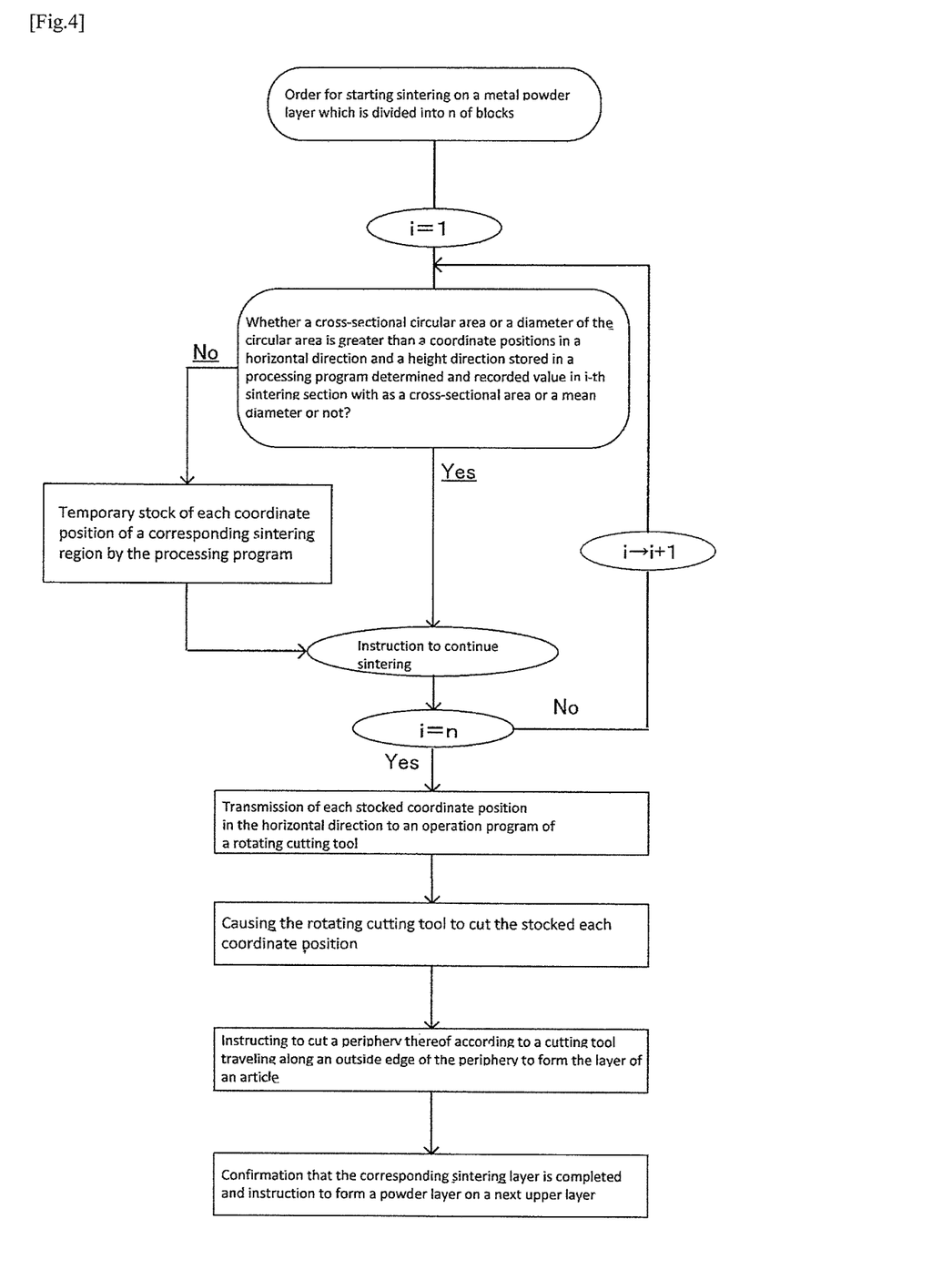
FIG. 4 shows a flowchart of forming each sintered layer of the basic configuration (1)-1.

Precisely, the basic configuration (1)-1 stands on that in the case of the raised sintered portions 12 forming on the upper side of the sintered region 11, the sintered portion 12 is cut entirely or partially by a process for each layer described in the flowchart shown in FIG. 4 on the basis of the above-described storing.

Explaining in detail, when each layer is sintered, the region at the coordinate positions in the horizontal direction and the height direction which has been stored by the control system is present on the layer concerned, the control system temporarily stocks the region at the coordinate positions, and also after sintering of the layer concerned is completed, at an intermediate height position between the position of the surface on which the sintering has been completed and the lowest position of a powder supplying blade 2 moving in the horizontal direction for forming a powder layer 4 on a next layer on the upper side of the layer concerned, the rotating cutting tool 3 travels around the region at the coordinate positions in the horizontal direction and an outer peripheral vicinity thereof on the basis of instructions of the control system, thereby, in the case of the raised sintered portions 12 forming on the upper side of the region at the coordinate positions, the rotating cutting tool 3 cuts the sintered portion 12 entirely or partially.

However, determination on whether or not the region concerned corresponds to a region at the coordinate positions in which the cross-sectional area or the mean diameter in the horizontal direction is equal to or less than a predetermined extent and instructions for the rotating cutting tool 3 on the basis of the determination are all carried out according to a unit of sintered section on each sintered layer.

Usually, $\pi$ mm$^2$ is set as a baseline of the cross-sectional area which is equal to or less than a predetermined extent. In most cases, 2 mm is set as a baseline of the mean diameter which is equal to or less than a predetermined extent.

In the basic configuration (1)-2, on sintering each layer, the control system determines whether or not the length of a shaping path formed by a continuous line for each scanning by an optical beam on the layer concerned is equal to or less than a predetermined extent.

The above-described determination is based on an empirical rule that a diameter of an optical beam and a line width on scanning are fixed for each scanning by the optical beam and, therefore, the length of the shaping path determines a cross-sectional area or a mean diameter in the horizontal direction.

Figure 5:
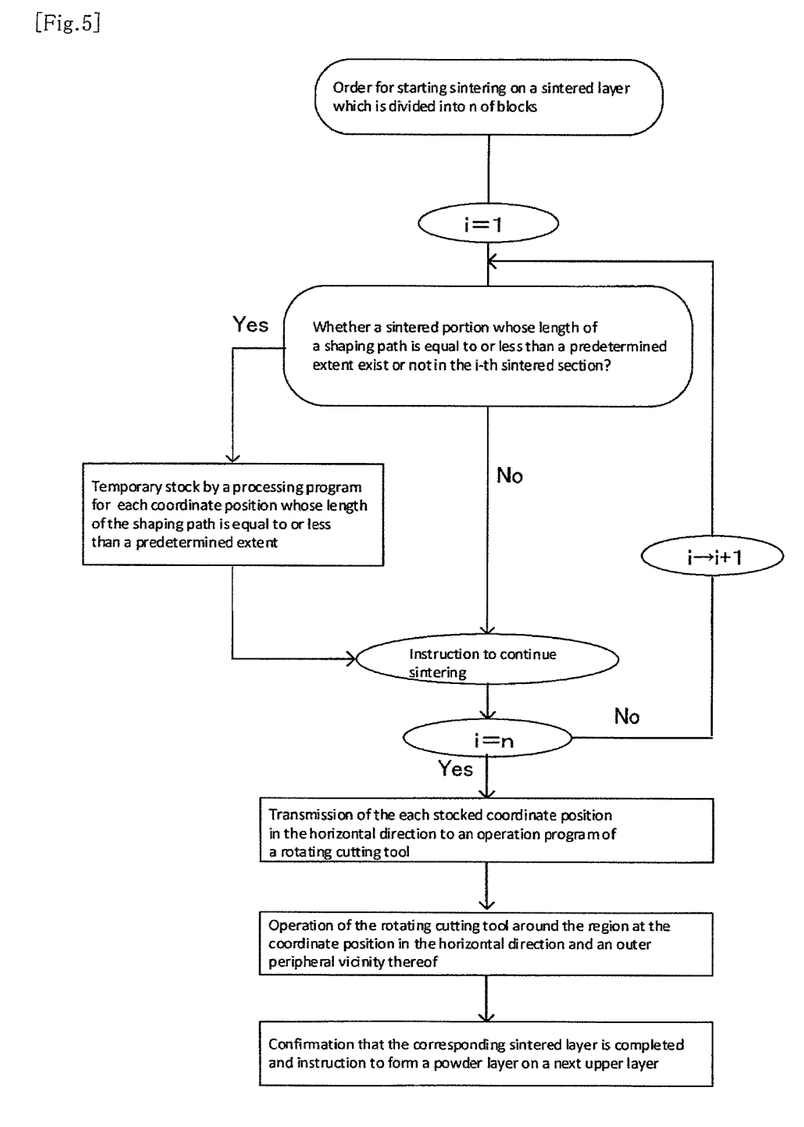
FIG. 5 shows a flowchart of forming each sintered layer of the basic configuration (1)-2.

The method for the basic configuration (1)-2 based on the above-described determination stands on that in the case of the raised sintered portions 12 forming on the upper side of the sintered region 11, the sintered portion is cut entirely or partially by a process for each layer described in the flowchart of FIG. 5.

Explaining in detail, when the above-described length is determined to be equal to or less than a predetermined extent, the control system temporarily stocks the coordinate positions in the horizontal direction and the height direction at the region of the shaping path in which the length is determined to be equal to or less than the predetermined extent, and also after sintering of the layer concerned is completed, at an intermediate height position between the position of the surface on which the sintering has been completed and the lowest position of a powder supplying blade 2 moving in the horizontal direction for forming a powder layer 4 on a next layer positioned on the upper side the layer concerned, the rotating cutting tool 3 travels around the region of the coordinate positions in the horizontal direction and an outer peripheral vicinity thereof on the basis of instructions of the control system, thereby, in the case of the raised sintered portions 12 forming on the upper side of the region of the coordinate positions, the rotating cutting tool 3 cuts the raised sintered portions 12 entirely or partially.

However, the determination on whether or not the length of the shaping path is equal to or less than a predetermined extent and instructions for a rotating and cutting tool 3 based on the determination are all carried out according to a unit of sintered section on each sintered layer.

It is noted that an example of specifically setting the length of the shaping path is as will be described later in Example 1.

In the basic configuration (2)-1, the control system stores in advance the region at the coordinate positions in the horizontal direction and the height direction in which the shaping width of an expected sintered part is equal to or less than a predetermined extent.

Figure 6:
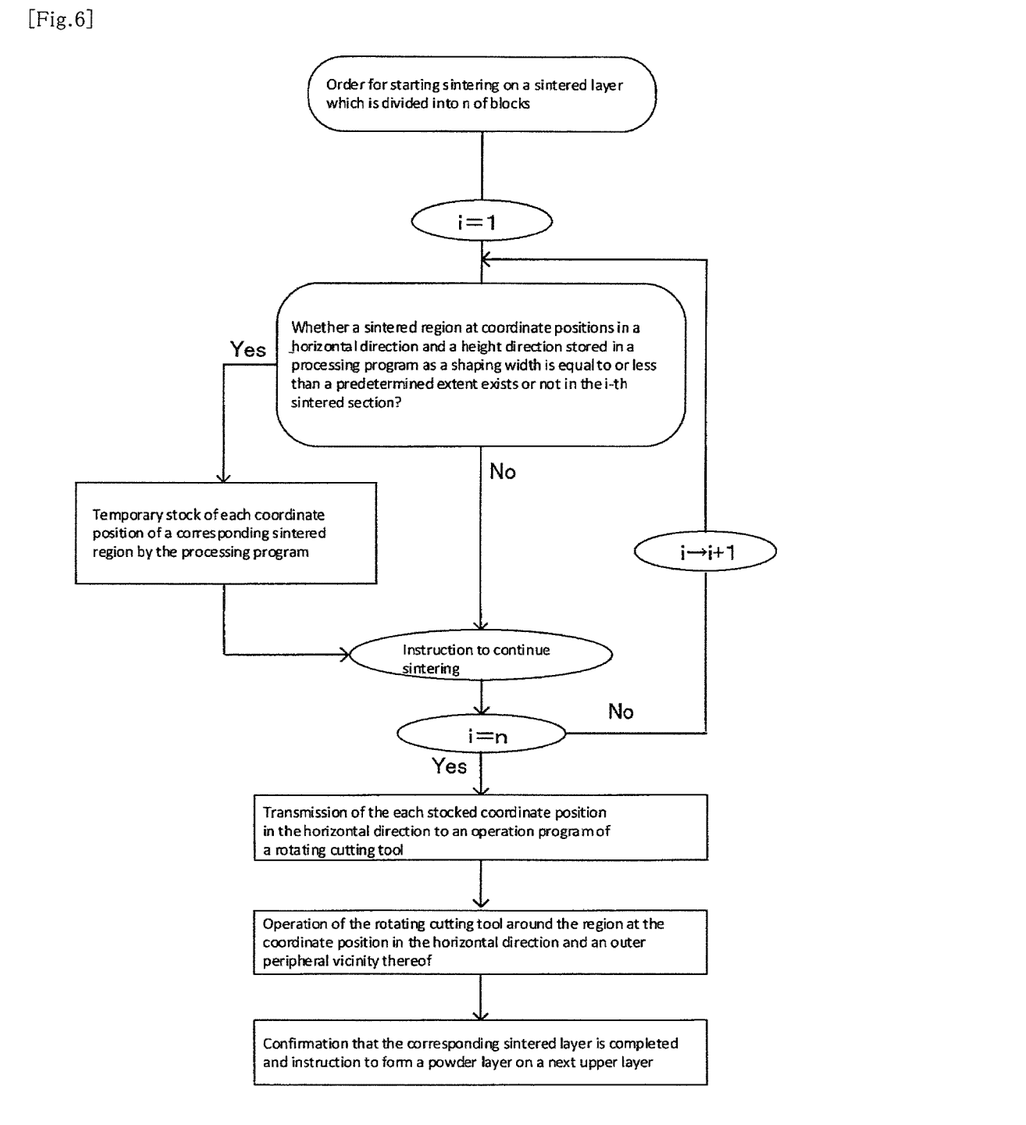
FIG. 6 shows a flowchart of forming each sintered layer of the basic configuration (2)-1.

Precisely, the basic configuration (2)-1 stands on that in the case of the raised sintered portions 12 forming on the upper side of the sintered region 11, the sintered portion 12 is cut entirely or partially by the process for each layer described in the flowchart of FIG. 6 on the basis of the above-described storage.

Explaining in detail, the region at coordinate positions in a horizontal direction and a height direction stored by the control system exists in the layer concerned on sintering, the control system temporarily stocks the region at the coordinate positions, and also after sintering of the layer concerned is completed, at an intermediate height position between the position of the surface on which the sintering has been completed and the lowest position of a powder supplying blade 2 moving in the horizontal direction for forming a powder layer 4 on a next layer on the upper side of the layer concerned, the rotating cutting tool 3 travels around the region of the coordinate positions in the horizontal direction and an outer peripheral vicinity thereof on the basis of instructions of the control system, thereby, in the case of the raised sintered portions 12 forming on the upper side of the region at the coordinate positions, the rotating cutting tool 3 cuts the raised sintered portions 12 entirely or partially.

However, determination on whether or not the region concerned corresponds to the region at the coordinate positions in which a cutting width is equal to or less than a predetermined extent and instructions for the rotating cutting tool 3 on the basis of the determination are all carried out according to an unit of sintered section on each sintered layer.

In most cases, 2 mm is usually set as a baseline of the shaping width which is equal to or less than a predetermined extent.

In the basic configuration (2)-2, on sintering each layer, the control system determines the number of parallel lines formed by folding back a continuous line for each scanning by an optical beam on the layer concerned and determines that the number is equal to or less than a predetermined number. The above-described determination is based on an empirical rule that a diameter of an optical beam and a line width for each scanning on an individual layer are fixed and, therefore, the shaping width is inevitably determined by the number of the lines.

Figure 7:
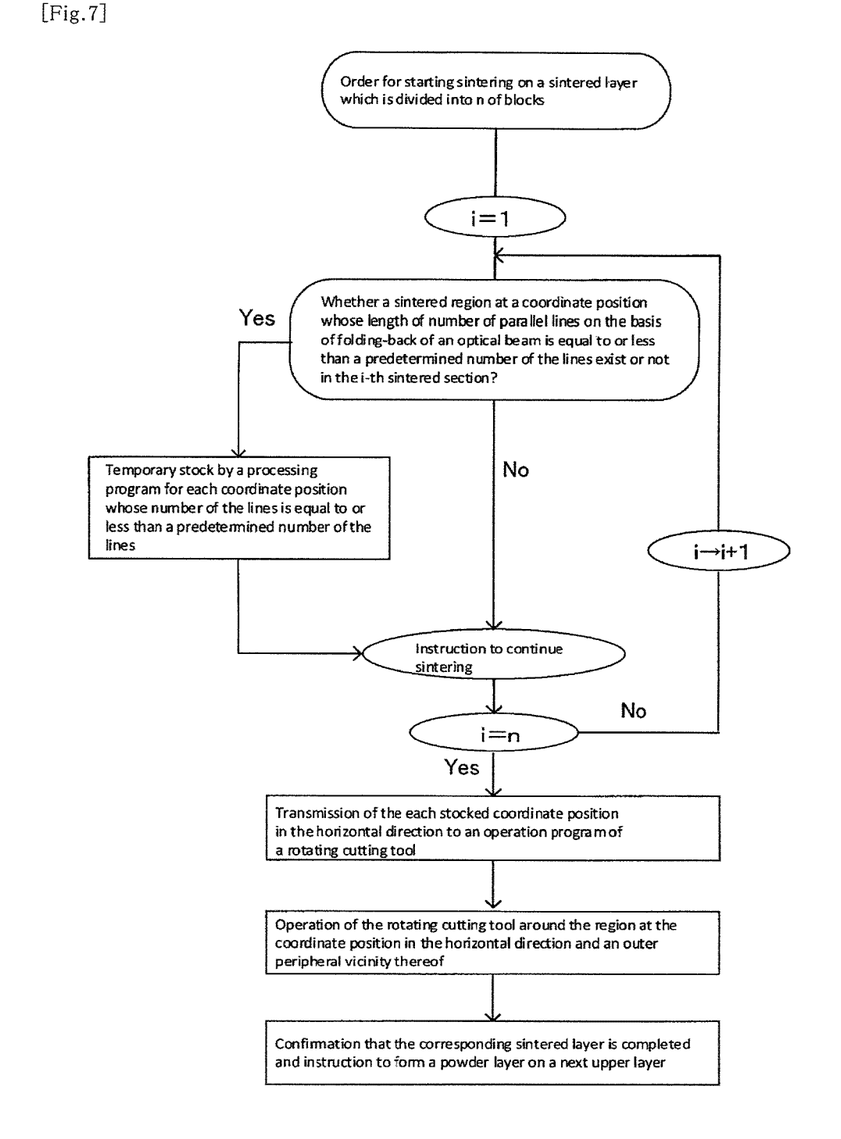
FIG. 7 shows a flowchart of forming each sintered layer of the basic configuration (2)-2.

The basic configuration (2)-2 based on the above-described determination stands on that in the case of the raised sintered portions 12 forming on the upper side of the sintered region 11, the raised sintered portions 12 are cut entirely or partially by the process for each layer which is described in the flowchart of FIG. 7.

Explaining in detail, when the above-described number is determined to be equal to or less than a predetermined number, the control system temporarily stocks coordinate positions in a horizontal direction and a height direction at the region of the shaping path in which the number is determined to be equal to or less than the predetermined extent, and also after sintering of the layer concerned is completed, at an intermediate height position between the position of the surface on which the sintering has been completed and the lowest position of a powder supplying blade 2 moving in the horizontal direction for forming a powder layer 4 on a next layer positioned on the upper side of the layer concerned, the rotating cutting tool 3 travels around the region at the coordinate positions in the horizontal direction and an outer peripheral vicinity thereof on the basis of instructions of the control system, thereby, in the case where a raised sintered portions 12 forming on the upper side of the region at the coordinate positions, the rotating cutting tool 3 cuts the sintered portion 12 entirely or partially.

However, determination on whether or not the number is equal to or less than a predetermined number and instructions for the rotating cutting tool 3 on the basis of the determination are all carried out according to a unit of sintered section on each sintered layer.

It is noted that an example of specifically setting the number of the lines is as will be described later in Example 2.

In the basic configuration (3)-1, the control system stores in advance a region at coordinate positions in which an undercut angle formed between an upper face and a lower inclined face at the end of the sintered part is equal to or less than a predetermined extent.

Figure 8:
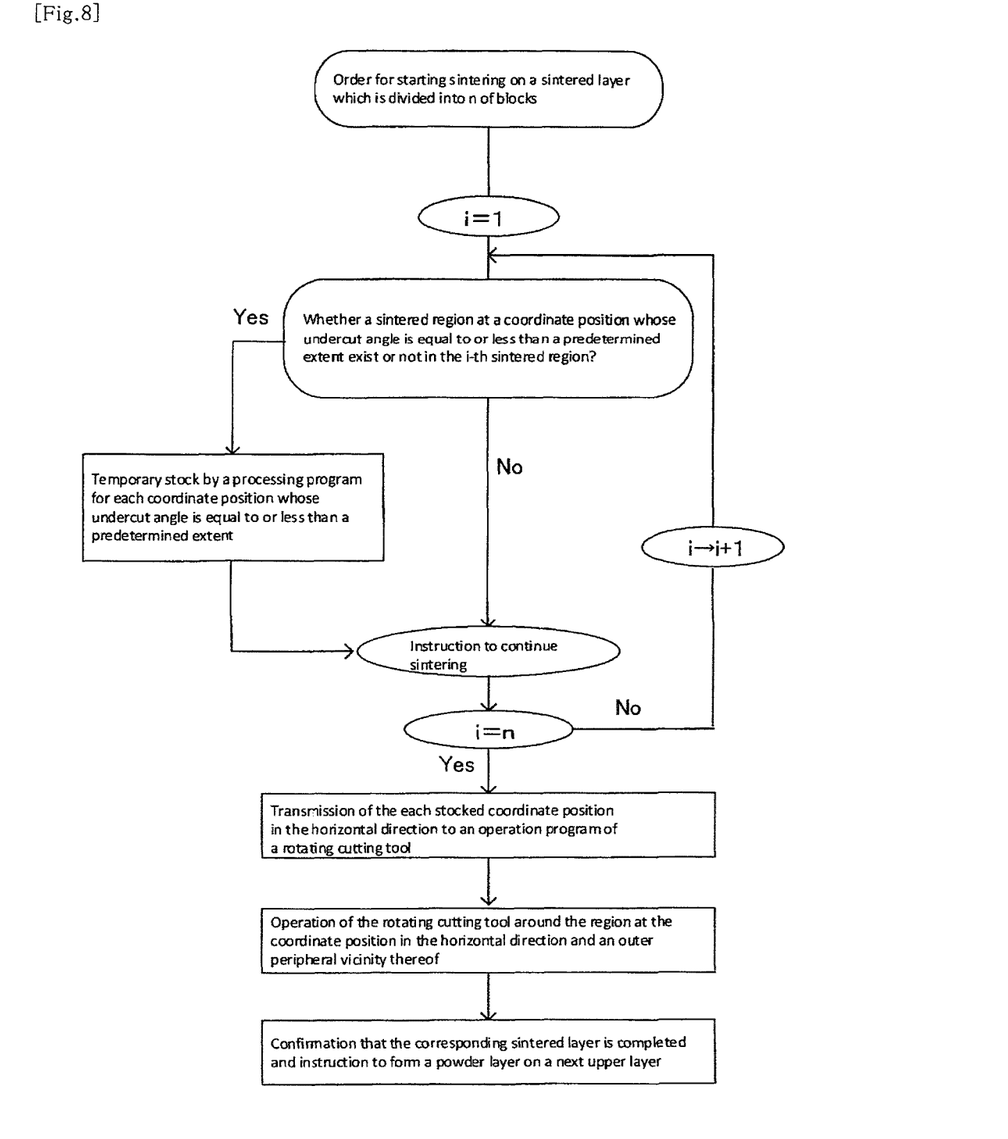
FIG. 8 shows a flowchart of forming each sintered layer of the basic configuration (3)-1.

Precisely, the basic configuration (3)-1 stands on that in the case of the raised sintered portions 12 forming on the upper side of the sintered region 11, the sintered portion 12 is cut entirely or partially by the process for each layer described in the flowchart of FIG. 8 on the basis of the above-described storing.

Explaining in detail, the region at coordinate positions in the horizontal direction and the height direction, after sintering of the layer concerned is completed, at an intermediate height position between the position of the surface on which the sintering has been completed and the lowest position of a powder supplying blade 2 moving in the horizontal direction for forming a powder layer 4 on a next layer positioned on the upper side of the layer concerned, the rotating cutting tool 3 travels around the region at the coordinate positions in the horizontal direction and an outer peripheral vicinity thereof on the basis of instructions of the control system, thereby, in the case of raised sintered portions 12 forming on the upper side of the region at the coordinate positions, the rotating cutting tool 3 cuts the raised sintered portions 12 entirely or partially.

It is noted that determination on whether or not the region concerned corresponds to the region at the coordinate positions in which the undercut angle is equal to or less than a predetermined extent and instructions for the rotating cutting tool 3 on the basis of this determination are all carried out according to a unit of sintered section on each sintered layer.

Furthermore, inmost cases, 45 degrees is set as a baseline of the undercut angle which is equal to or less than a predetermined extent.

In the basic configuration (3)-2, on an individual layer to be sintered, a scanning position at the edge of a scanning site of an optical beam is increased horizontally in region and in a state of projecting to a greater extent than a scanning position at the edge of the optical beam on an immediately preceding sintered layer positioned so as to be adjacent to a lower side of the layer concerned at a position lower than the scanning position concerned, and also a height width between both ends thereof is divided by a horizontal width to calculate a ratio, and whether or not the ratio is equal to or less than a predetermined number is used as a base for determination. This is based on an empirical rule that where the ratio is equal to or less than a predetermined number, the undercut angle is also equal to or less than a predetermined extent.

However, both cases are adopted corresponding one case that a scanning direction at the edge of an optical beam on each layer and a scanning direction at the end of the optical beam on a next layer positioned on the upper side of the layer concerned are in the same direction and the other case that they are in the opposite direction from each other.

Figure 9:
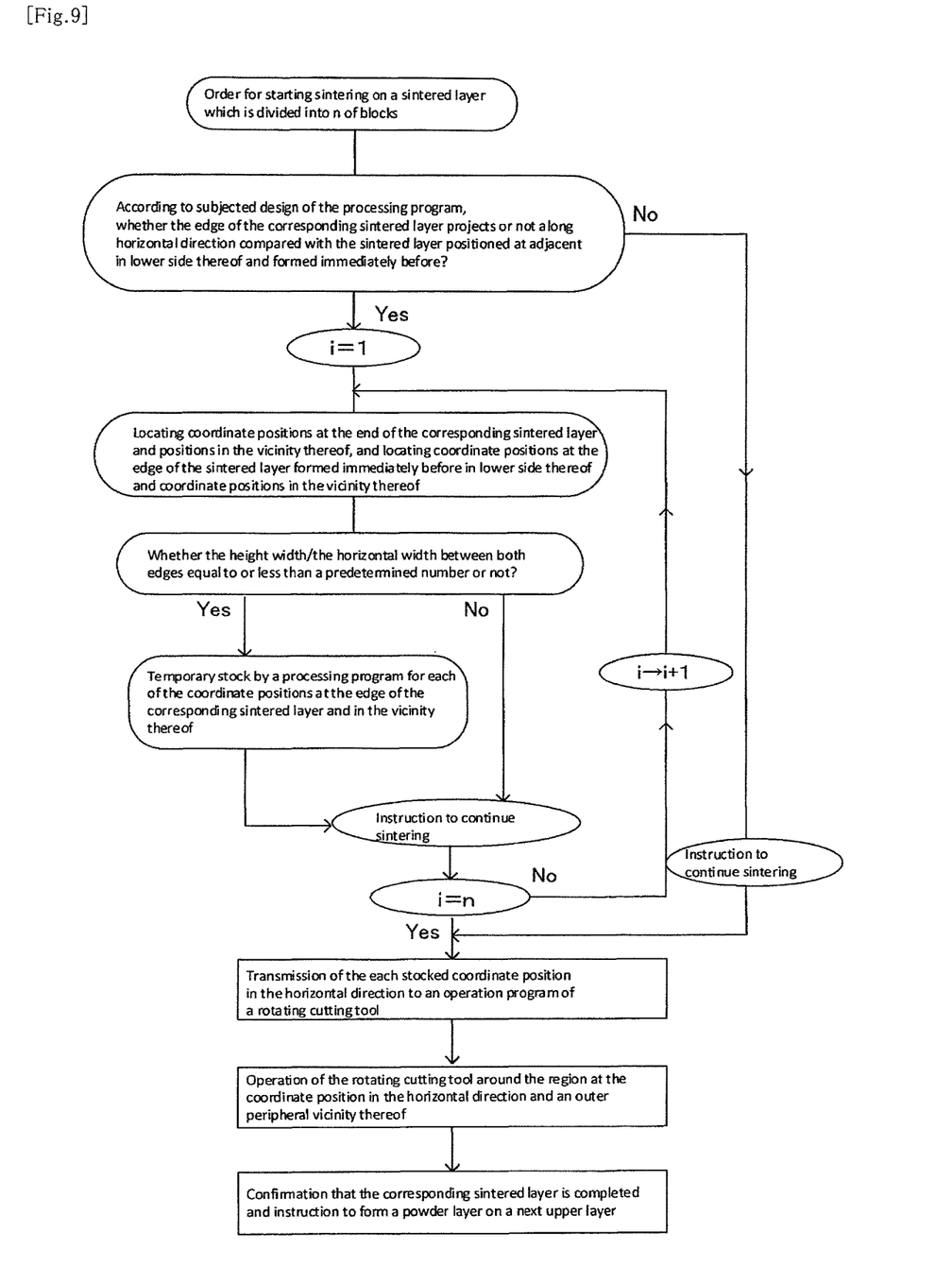
FIG. 9 shows a flowchart of forming each sintered layer of the basic configuration (3)-2.

With the above-described both cases taken into account, the method for the basic configuration (3)-2 stands on that in the case of the raised sintered portions 12 forming on the upper side of the sintered region 11, the sintered portion 12 is cut entirely or partially by the process for each layer described in the flowchart of FIG. 9.

Explaining in detail, on an individual layer to be sintered, a scanning position at the edge of a scanning site of an optical beam is increased horizontally in region and in a state of projecting to a greater extent than a scanning position at the end of the optical beam on an immediately preceding sintered layer positioned so as to be adjacent to a lower side of the layer concerned at a position lower than the scanning position concerned, and also a height width between both edges is divided by a horizontal width to calculate a ratio, and when the ratio is determined to be equal to or less than a predetermined number, the control system temporarily stocks the coordinate positions in the horizontal direction and the height direction at the projection end in which the ratio is determined to be equal to or less than the predetermined number and an adjacent region thereof, and also after sintering of the layer concerned is completed, at an intermediate height position between the position of the surface on which the sintering has been completed and the lowest position of a powder supplying blade 2 moving in the horizontal direction for forming a powder layer 4 on a next layer on the upper side of the layer concerned, the rotating cutting tool 3 travels around the region at the coordinate positions in the horizontal direction and an outer peripheral vicinity thereof on the basis of instructions of the control system, thereby, in the case where raised sintered portions 12 are formed which is positioned on the upper side of the region at the coordinate positions in the horizontal direction, cutting the sintered portion entirely or partially.

However, the height width and the horizontal width are different in baseline of setting method, depending on the scanning direction of the optical beam.

Precisely, upon setting the height width and the horizontal width between both ends, where the scanning direction of the optical beam at each end and in the vicinity thereof is along the direction at the end concerned, the coordinate positions on traveling at the end concerned is given as a baseline, and where the scanning direction of the optical beam at each end and in the vicinity thereof is not along the direction at the end concerned, the coordinate positions at the end of a folding-back region at the end of the optical beam is given as a baseline.

However, determination on whether the ratio is equal to or less than a predetermined number or not and instructions for the rotating cutting tool 3 on the basis of the determination are all carried out according to a unit of sintered section on each sintered layer.

It is noted that an example of specifically setting the ratio is as described later in Example 3.

Figure 10:
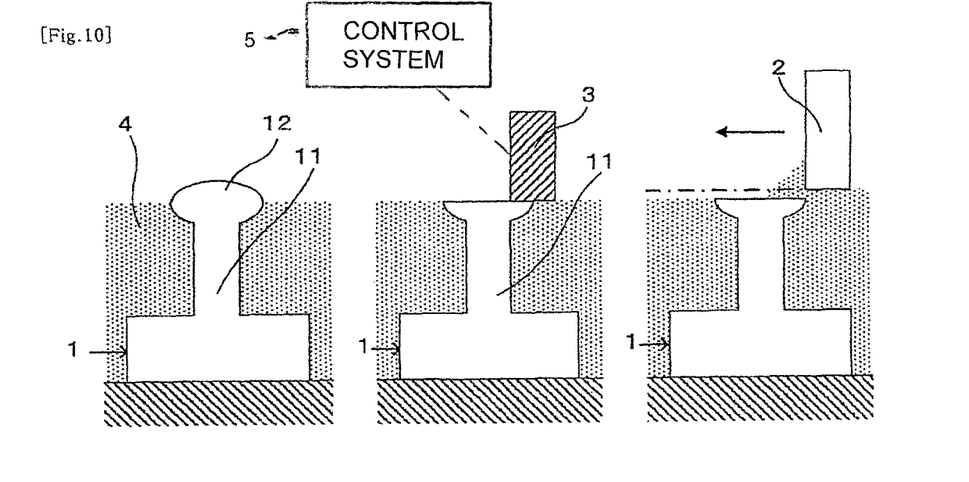
FIG. 10 is a side view which shows effects of the present invention in accordance with the basic configurations (1)-1 and (1)-2.

In the present invention based on each of the basic configurations, even though the raised sintered portions 12 have been formed, as shown in FIG. 10, in a stage before the formation of a next layer positioned on the upper side of the layer concerned, the cutting tool 3 is rotated to cut the raised sintered portions 12 entirely or partially, thus it is possible to avoid collision between the powder supplying blade 2 and the raised sintered portions 12 on a next layer positioned on the upper side of the layer concerned. It is therefore possible to achieve the three-dimensional shaping in an extremely efficient manner.

It is noted that FIG. 10 shows the basic configuration (1)-1 and the basic configuration (1)-2, but the above-described collision can also be avoided in the cases of basic configuration (2)-1, the basic configuration (2)-2, the basic configuration (3)-1 and the basic configuration (3)-2.

Hereinafter, a description will be given with reference to examples.

EXAMPLES

Example 1

In the basic configuration (1)-2, when the diameter of an optical beam in the vicinity of the coordinate positions is given as d mm, the width between scanning lines associated with folding-back of the optical beam is given as w mm, and the number of parallel traveling lines associated with folding-back of the optical beam is given as N, Example 1 is characterized in that the length of the shaping path formed for each of the optical beams is expressed by the formula shown below.

$$N\{\pi(1-d^2/4)-(N-1)wd\}/\{(N-1)w+d\} \text{ mm} \quad \text{[Formula 1]}$$

The reason for the length of the shaping path expressed by the formula shown below is as follows:

$$N\{\pi(1-d^2/4)-(N-1)wd\}/\{(N-1)w+d\} \text{ mm} \quad \text{[Formula 2]}$$

Figure 1:
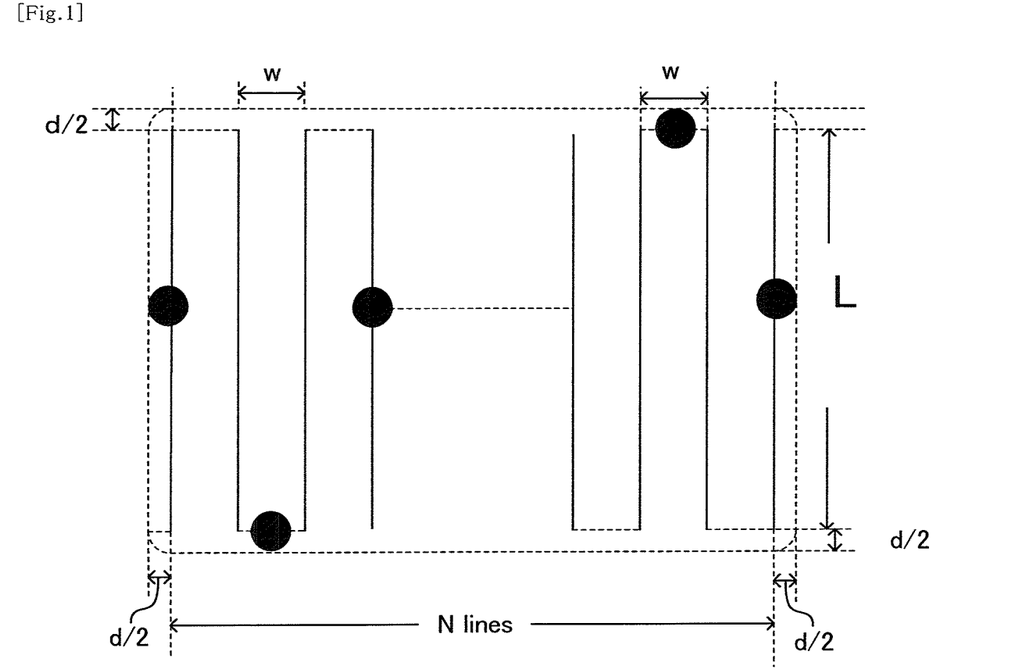
FIG. 1 is a plan view to explain for leading out a general formula in Example 1.

As shown in FIG. 1, in the case that a mean length of the N lines traveling in parallel is L mm, a width of the region surrounded by lines on both sides along the direction orthogonal to the parallel direction is expressed as (N−1)w.

As shown in FIG. 1, each of the (N−1) folding-back regions projects only by a radius of an optical beam of d/2 in the line direction at both ends of each of the N lines.

So, an area of the region which is surrounded by the N lines and also includes the above-described projection regions is expressed as (N−1)w(L+d) mm.

A region projects only by the radius of an optical beam of d/2 in the orthogonal direction also in each of two outside lines in the N lines. A total area of these projecting regions is approximately Ld mm.

Furthermore, at both ends of each of the two outside lines, as shown in FIG. 1, four regions exist with the state surrounded by a quarter circular arc. A total area of the four regions is expressed as $\pi d^2/4$ mm.

Therefore, as described in the basic configuration (1)-1, where $\pi$ mm$^2$ is set as an ordinarily adopted baseline in which a cross-sectional area in the horizontal direction is equal to or less than a predetermined extent, the formula shown below is established.

$$(N-1)w(L+d)+Ld+\pi d^2/4=\pi \quad \text{[Formula 3]}$$

And, the formula shown below can be led out.

$$L=\{\pi(1-d^2/4)-(N-1)wd\}/\{(N-1)w+d\} \text{ mm} \quad \text{[Formula 4]}$$

Therefore, when an entire length of the line in which the mean width of the N lines is given as L mm is given as L', the formula shown below can be obtained.

$$L'=NL=N\{\pi(1-d^2/4)-(N-1)wd\}/\{(N-1)w+d\} \text{ mm} \quad \text{[Formula 5]}$$

Example 2

In the basic configuration (2)-2, Example 2 is characterized in that where a diameter of an optical beam is given as d mm and a width between scanning lines associated with the folded-back optical beam is given as w mm, the number of the lines in the sintered region 11 is a maximum value of integer in terms of a numerical value of 1+(2−d)/w.

The reason for the formula shown below established as the shaping width can be explained as follows with reference to FIG. 2.

$$1+(2-d)/w \quad \text{[Formula 6]}$$

Figure 2:
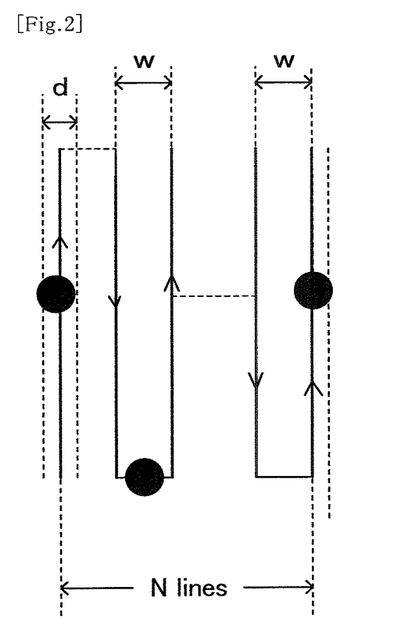
FIG. 2 is a plan view to explain for leading out a general formula derived in Example 2.

As apparent from FIG. 2, a width of the sintered region 11 formed by N traveling lines of parallel optical beams is expressed as (N−1)w+d.

Therefore, as described in the basic configuration (2)-1, where 2 mm is set as an ordinarily adopted baseline in which the shaping width is equal to or less than a predetermined extent, the formula shown below is established, $$(N-1)w+d=2 \quad \text{[Formula 7]}$$

and the formula shown below can be obtained.

$$N=1+(2-d)/w \quad \text{[Formula 8]}$$

Example 3

In the basic configuration (3)-2, Example 3 is characterized in that a ratio which is obtained by dividing a height width between both ends by a horizontal width is 1:1.

Figure 3:
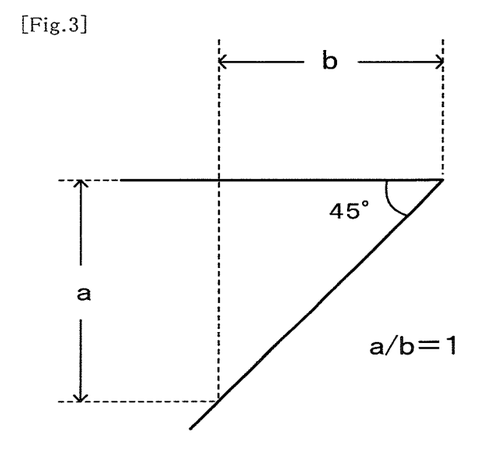
FIG. 3 is a perpendicular sectional view to explain a numerical value of a ratio in Example 3.

The grounds thereof are demonstrated by the fact that, as shown in FIG. 3, the undercut angle forms 45 degrees when the ratio is 1:1.

Effect of the Invention

In the present invention which is composed of the basic configurations (1)-1, -2, (2)-1, -2 and (3)-1, -2, a cause for forming raised sintered portions on each layer is detected in advance efficiently and reliably, and the sintered portion is cut entirely or partially by a rotating cutting tool in a stage before the formation of a next layer positioned on the upper side of the layer concerned. Thereby, it is possible to prevent in advance problems in forming a powder layer on a next layer positioned on the upper side of the layer concerned.

The three-dimensional shaping method of the present invention is able to provide efficient shaping without any problems in traveling of a powder supplying blade, even if raised sintered portions are formed by sintering a fine sintered region in such a manner that any one of a cross-sectional area or a mean diameter in the horizontal direction, a shaping width and an undercut angle at the edge is made equal to or less than a predetermined extent. Therefore, the method has a great range of applications.

What is claimed is:

1. A three-dimensional shaping method for forming a three-dimensional product, comprising the steps of:
   (1)-1 forming forming a powder layer with a predetermined thickness,
   (1)-2 on each said layer to be sintered, in which instructions that raised sintered portions are formed after sintering from a sintered region, with positions in a horizontal direction and a height direction having one of a cross-sectional circular area and a diameter of the circular area before sintering the region, is based according to the following comparison standard:
   whether the one of the cross-sectional circular area and the diameter is greater than a predetermined value,
   (2)-1 in the case that the one of the cross-sectional circular area and the diameter of the circular area is greater than the predetermined value such that the raised sintered portions are not formed, causing the region to be sintered,
   (2)-2 (i) in the case that the one of the cross-sectional circular area and the diameter of the circular area is not greater than the predetermined value such that the raised sintered portions are formed, temporarily stocking positions in the horizontal direction and the height direction at a region of the one of the cross-sectional circular area and the diameter of the circular area,
    (ii) causing the respective powder layer to be sintered after said temporarily stocking,
    (iii) causing a rotating cutting tool to cut the stocked positions, so that the rotating cutting tool cuts any raised sintered portions,
(3) causing a cutting tool to cut a periphery thereof while traveling along an outside edge of the periphery to form the layer of an article, the step of cutting a periphery occurring according to one of the following:
    if the step (2)-2 (iii) occurs, after the step (2)-2 (iii), or
    if the step (2)-2 (iii) does not occur, after the sintering in step (2)-1 and
(4) repeating steps (1)-(3) for each layer in an additive manufacturing process.

2. The three-dimensional shaping method according to claim 1, wherein one of:
the cross-sectional circular area is $\pi$ mm$^2$ and
the diameter of the circular area is 2 mm.

* * * * *